Patented Jan. 7, 1936

2,026,838

UNITED STATES PATENT OFFICE 2,026,838

REFRIGERATING MEANS AND METHOD

Edward C. Koepke, Cleveland, Ohio, assignor to The Bishop & Babcock Sales Company, Cleveland, Ohio, a corporation of Ohio Application June 10, 1931, Serial No. 543,254

7 Claims. (Cl. 62—101)

This invention relates to refrigerating apparatus and particularly to refrigerating apparatus for use in connection with dispensing soda fountains and the like.

It has become common practice to construct dispensing soda fountains to provide therein compartments for containing and refrigerating ice cream cans, fruits and other eatables, compartments or apparatus for chilling a supply of drinking water, both carbonated water and city water, etc.

Heretofore, furthermore, attempts have been made to extend the refrigerating system of the fountain to effect a cooling or chilling of the jars of syrup with which the fountain is supplied. This desirable result, however, has not been satisfactorily accomplished heretofore because of the fact that in practically all designs of soda fountains, it is desirable or necessary to locate the syrup jars at points of relatively high elevation on the fountain, and because the practical and economical refrigeration of the other compartments of the apparatus such as those mentioned above has been by means of brine tanks. No practical and efficient apparatus has been proposed for chilling the syrup jars because of the difficulty and impracticability and inefficiency of conducting the refrigerating brine up to the higher levels of the syrup jars.

Again, in connection with the refrigerating compartment or apparatus for chilling drinking water, it has heretofore been found necessary either to provide a relatively large storage of chilled water to obviate the continuous starting up and shutting down of the pump of the refrigerating system concurrently with the repeated drawing of relatively small drafts of water at the fountain; or, to provide a relatively large chilling apparatus for the water such as apparatus including a brine tank or ice compartment.

Again, in dispensing soda fountains and the like, it is desirable in some cases to refrigerate different compartments of the cabinet at different temperatures and to maintain the temperatures constant under differently varying demands at the different compartments.

It is therefore one of the objects of my invention to provide generally a refrigerating system for dispensing soda fountains or the like, in which a refrigerant medium may be applied in an improved manner to the chilling of syrup jars or the like.

Another object is to provide a refrigerating system for dispensing fountains or the like comprising means for chilling syrup jars or the like disposed at a high level on the fountain in combination with a refrigerating means of the brine or other liquid tank type disposed at a lower level, both refrigerating means operated by a single refrigerant compressor pump outfit.

Another object is to provide an improved means for chilling drinking water in a dispensing soda fountain or the like whereby repeated drafts of water may be dispensed and the water maintained chilled without requiring either a large storage capacity of chilled water or of refrigerated chilling medium, or requiring frequent starting and stopping of the compressor outfit.

Another object is to provide, in a dispensing soda fountain or the like, in which articles such as beverages and eatables to be dispensed are contained and refrigerated in different compartments, an improved apparatus for refrigerating the several compartments each in a manner suitable to the nature of the article to be dispensed and to the mode of dispensing them, and all of said differently functioning and differently constructed refrigerating elements being coordinated in a manner permitting of their being operated from a single pump compressor outfit.

Another object is to provide an improved system of refrigeration in which refrigeration in several different refrigerating compartments may be effected by a single refrigerating medium circulated through the system by a single compressor pump outfit, the refrigeration in the several compartments being automatically regulated to different desired temperatures, and the refrigerating demands upon the system varying differently in the different compartments, and the whole system being coordinated to function without interference with the refrigeration effected in one compartment by that in another.

Other objects will be apparent to those skilled in the art to which my invention appertains.

My invention is fully disclosed in the following description taken in connection with the accompanying drawings, in which:—

Figures 1, 2:
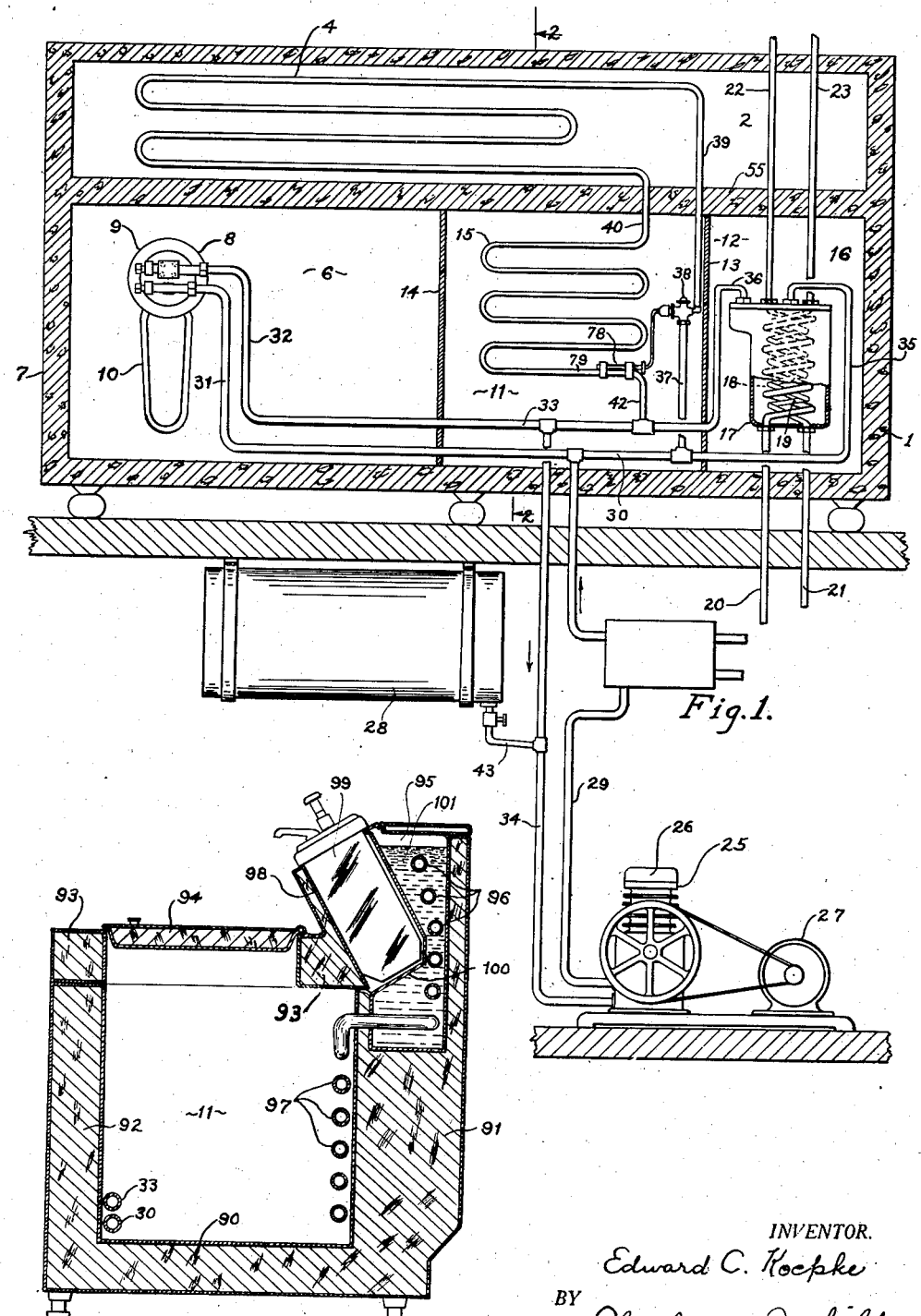
Fig. 1 is a longitudinal, elevational sectional view, in some respects diagrammatic, of a dispensing fountain illustrating an embodiment of my invention.
Fig. 2 is a cross-sectional view of a dispensing fountain illustrating one embodiment of my invention in an actual apparatus and may be referred to Fig. 1 as of the plane 2—2 thereof.

Referring to the drawings, Fig. 1, I have shown at 1, in simplified diagrammatic form, the outer wall of the refrigerating cabinet and at 2 a refrigerating chamber in the upper part of the cabinet, filled with a refrigerating liquid such as sweet water or water having a predetermined relatively small amount of salt therein, adapted to be chilled by refrigerating medium in a coil of pipe 4 in the chamber. To illustrate certain principles and elements of my invention, the chamber 2 is illustrated as disposed in the upper part of the cabinet 1, and a bottom wall 55 of the chamber 2 is shown as dividing the cabinet longitudinally into upper and lower portions.

Below the wall or partition 55 is illustrated a chamber 6 filled with a brine solution in which is immersed a refrigerating unit 8, preferably of the so-called flooded type and which may be of any suitable or known construction but preferably comprises a boiler head 9, depending U-shaped tubes 10 connected therewith, and in the head 9, a valve of float or other type to maintain in the head refrigerating fluid therein at a predetermined level.

The lower part of the cabinet 1 is also provided with a chamber 11 and a chamber 12, separated from each other by a vertical partition 13, the chamber 11 being separated from the chamber 6 by a vertical partition 14.

The chamber 11 has disposed therein, preferably against the rear wall thereof, a coil of pipe 15 in which a refrigerant medium is adapted to flow in a manner to be described to chill the air contents of the chamber 11.

The chamber 12 has disposed therein a cooling apparatus, indicated generally at 16, and which may be of any known or suitable type but preferably comprises an outer casing 17 having therein two coils or convolutions of pipe 18 and 19 connected respectively to supply pipes 20 and 21, supplying, from suitable sources, respectively city water and carbonated water for beverage purposes. The coils 18 and 19 have respectively outlet pipes 22 and 23 connected thereto which pass outwardly through the wall of the cabinet 1 to dispensing faucets not shown.

Within the housing 17, the coils 18 and 19 are preferably immersed in a refrigerating medium adapted to refrigerate by evaporation and preferably apparatus of known construction is enclosed within the casing 17 to maintain the level of the medium therein within predetermined limits and to maintain the pressure thereof also within predetermined limits, to effect automatic regulation of the refrigeration to a substantially constant temperature.

Indicated generally at 25 is a refrigerant compressor outfit comprising a pump 26 and a motor 27 to drive the same, and this compressor outfit may be of any known or suitable construction and preferably includes automatic means for starting the motor and for stopping it when the pressure of refrigerant supplied by the pump on its pressure side reaches predetermined minimum and maximum values, respectively; and when the pressure on the suction or receiving side of the pump reaches predetermined minimum and maximum values respectively; and such automatic means may be any known means which has been employed for this purpose heretofore.

At 28 is indicated a tank having suitable volumetric capacity and which will be referred to as an equalizer tank.

The various pieces of apparatus above mentioned are connected together in a refrigerating system as follows. A pressure supply pipe 29 leads from the pump 26 to a main 30 preferably disposed along the bottom of the cabinet 1. From the main 30 a pipe 31 supplies a refrigerant under pressure from the pump 26 to the boiler 8. A return suction pipe 32 connected to the boiler communicates with a main 33 to which is connected the suction line 34 connected to the pump 26.

The main 30 is also connected by a pressure supply pipe 35 to the interior of the casing 17 of the cooling apparatus 16 and a suction return pipe 36 connects the casing 17 to the main 33.

Also, a pipe 37 connects the main 30 to the coil 4, the line of flow being through an expansion valve 38 and an intermediate pipe 39, the valve 38, as indicated in Fig. 1, being disposed in the line of the pipes 37 and 39. The coil 4 is connected by a return pipe 40 to the coil 15 in the chamber 11 which communicates by a pipe 42 with the main 33.

The equalizer tank 28 is connected by a pipe 43 to suction line 34.

Figure 3:
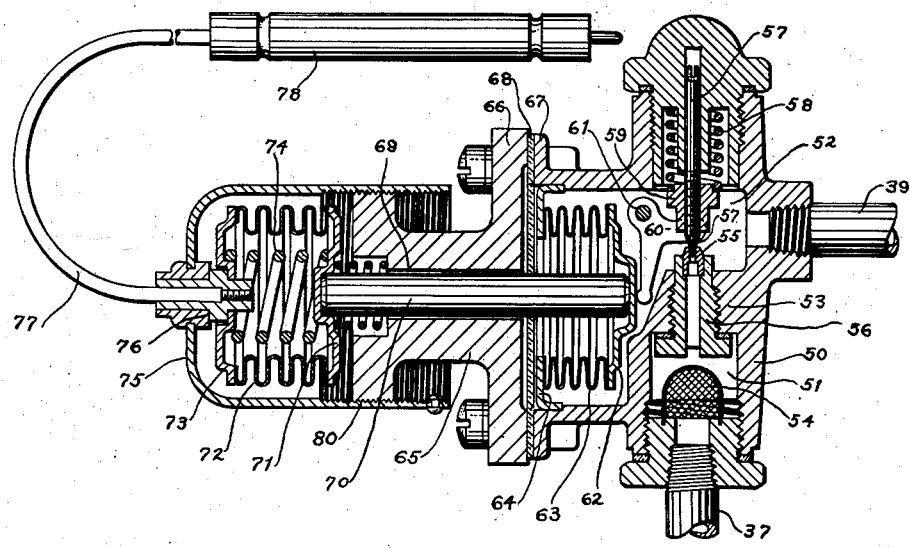
Fig. 3 is a cross-sectional view of an expansion valve construction which I may employ and indicated diagrammatically in Fig. 1.

The expansion valve device 38, above referred to, is illustrated separately in Fig. 3. The exact details of construction of this device form no essential part of my invention. The device illustrated comprises a main housing 50 in which is formed a compression chamber 51 and an expansion chamber 52 separated by a partition 53. A pipe 37 communicates with the chamber 51 and a pipe 39 with the chamber 52, these pipes being those illustrated in Fig. 1 and having the same reference characters. Refrigerant fluid under pressure enters the chamber 51 through the pipe 37 and through a strainer 54 in the chamber, and thence escapes into the chamber 52 through a needle valve orifice 55 disposed in the chamber 52 on the end of a removable plug 56 in the partition 53, the size of the orifice 55 being determined by the longitudinal position of a needle valve element 57, the point of which is disposed in the orifice 55. By this construction the refrigerant fluid expands into a gas or vapor in the chamber 52 and flows therefrom through the pipe 39.

The needle valve 57 is normally maintained in orifice-closed position by a spring 58 in the housing 50, one end of which abuts upon a head 59 on the valve element 57. A bell crank 60, pivoted on the housing 50 and in the chamber 52, has a generally horizontal arm, the end of which engages a suitable shoulder on the head 59 and has a generally vertical arm the lower end of which engages a sheet metal head 62, generally of disc form, and which is sealed movably to the inner wall of the chamber 52 by a generally cylindrical bellows 63, one end of which is sealed to the periphery of the head 62 and the other end of which is sealed to an annular flange 64 projecting inwardly into the chamber 52.

A head 65 has a flange 66 screwed or bolted to a corresponding flange 67 on the housing 50, a sealing disc 68 being interposed therebetween, and the head 65 has a bore 69 substantially aligned with the axis of the bellows 63.

A plunger 70 is mounted reciprocatorily in the bore 69 and at one end abuts upon the disc 62 on the opposite side thereof from the bell crank 60, extending axially inwardly of the bellows 63 and at its opposite end abuts upon a sheet metal head 71 of disc form to the peripheral edge of which is sealed one end of a generally cylindrical bellows 72, the other end of which is sealed in a disc head 73. The plunger 70 projects outwardly from the bore 69 to engage the head 71 to provide clearance space between the head 71 and the head 65. Within the bellows 72 is a compression spring 74 abutting at opposite ends upon the inner surfaces of the disc-like heads 71 and 73. The head 73 rests upon the bottom of a cup 75, or, upon inwardly axially extending elements indicated generally at 76. A pipe 77 communicates with the interior of the bellows 72 through the elements 76 and externally terminates in a bulb 78 in which is placed a suitable quantity of thermally expansible fluid such as methyl chloride.

The bulb 78 is adapted to be secured or clamped in intimate contact with an element of the refrigerating system to the temperature of which the valve device as a whole is intended to be responsive. In the refrigerating system of Fig. 1, the bulb 78 is clamped to the last convolution 79 of the coil 15 in the chamber 11.

Referring again to Fig. 3, a rise of temperature communicated to the bulb 78 will expand the fluid therein and correspondingly increase the pressure in the bellows 72 and move the head 71 and plunger 70 toward the right as viewed in the figure, thus communicating a movement of the bell crank 60 counter-clockwise around its pivot 61 and increasing the size of the orifice 52 by a partial removal of the needle point of the valve element 57 out of the orifice.

This action will increase the rate of admission of expanded refrigerating medium from the pipe 37 to the pipe 39 through the valve device, and vice versa upon a reduction of temperature of the bulb 78.

The cup 75 is screw-threaded upon the head 65 as at 80, whereby the effectiveness at a given temperature of the bellows 72 may be adjustably varied. Also, the needle valve 57 is screw-threaded into the head 59 and therefore adjustable therein, whereby the opening of the orifice 55 for any given temperature may be adjusted. Thus the device may be adjusted to respond suitably to given temperatures of the convolution 79 of the coil 15, and may be adjusted to supply the required amount of refrigerant to maintain the given temperature.

In the operation of my invention thus far described, the pump 26 and its accessory apparatus may be adjusted to maintain the refrigerant in the boiler 8 at a predetermined minimum evaporating pressure and to stop when the pressure is attained and to start up again when the pressure rises to a predetermined maximum value as in well recognized practice, thus maintaining a constant brine tank temperature.

The fluid under pressure is supplied by the pump by way of the pressure pipe 29 and withdrawn by way of the suction line 34, thus maintaining the main 30 under pressure and the main 33 under reduced pressure or suction. The reduced pressure of the main 33 is communicated to the tank 28, the pressure within the tank being substantially the same as that in the line 34. During operation of the cooling device 16, due to the relatively small refrigerating capacity of the same, a draft of drinking water therethrough, either through the line 20—22 or the line 21—23, will tend to raise the temperature within the device 16 and correspondingly increase the pressure therein; and the tendency to an increase of pressure in the casing 17 will be equalized or compensated for by the reservoir capacity of the tank 28, and thus the pump 26 will not be started.

Thus repeated drafts of drinking water may be drawn at the fountain before the requirements of the cooling device 16 will total such a demand as to increase the pressure in the main 33 and line 34 to exhaust the capacity of the tank 28 to the point at which the pump 26 will start up to again exhaust the tank 28.

The refrigerant under pressure in the main 30 is conducted by the pipe 37 through the expansion valve device 38 and pipe 39 to the coil 4. Expansion of the fluid in the device 38 reduces the temperature and pressure thereof in a well known manner, and refrigeration of the liquid in the chamber 2 is effected thereby. After passing through the coil 4, the refrigerant, in some instances partly gasified or vaporized, flows by way of the pipe 40 through the coil 15 and thence to the low pressure main 33. The chamber 11 therefore is cooled by further gasification or vaporization of the refrigerant.

The temperature in the chamber 11 is automatically maintained by the automatic action of the expansion device 38 which, as above described, operates to increase the supply of refrigerant upon an increase of temperature and vice versa upon a decrease of temperature of the bulb 78; and the bulb is preferably clamped upon the last convolution or termination of the coil 15 for this purpose.

It is one of the particular advantages of my invention that by employing an expansion type of refrigeration for the chamber 2, the chamber 2 may be advantageously employed to chill the syrup jars of a dispensing fountain because the coil 4 may be disposed at any desired height above the other parts of the fountain, particularly above the ice cream chilling brine tank 6.

In Fig. 2 is illustrated in cross-section the arrangement of a fountain in which this feature of my invention is embodied. The lower part of the cabinet comprises a bottom 90, rear and front walls 91 and 92, and a top wall 93 insulated in the well known manner. An insulated door 94 is provided in the top wall to give access to the chamber 11. The rear wall 91 is carried up above the top wall 93 and is formed to provide therein a tank 95 in which sweet water or slightly salt water may be placed.

The convolutions of the coil 4 are indicated at 96 and the convolutions of the coil 15 at 97. At 98 is shown a receptacle for a syrup jar 99, the receptacle having bottom and rear walls 100 and 101 respectively, forming part of the front wall of the tank 95. Thus a syrup jar 99 in the receptacle 98 is exposed to the chill of the water in the tank 95 and the water may thus be carried up around the syrup jar to effectively and efficiently conduct heat away therefrom or apply the chill thereto.

As indicated in Fig. 1, the chamber 2 may be of any desired length longitudinally so that any desired number of jars may be all chilled by the water in the single tank 95.

It will now be observed that by the system embodying my invention, frequent starting and stopping of the pumping outfit is obviated. The demands made by the coils 4 and 15 are relatively light and may be controlled to refrigerate at relatively high temperatures independently of the relatively low temperature of the brine tank 6, and the frequent demands made upon the relatively small capacity chilling outfit 16 are counter-balanced by the storage tank 28. In installations in which the frequent starting and stopping of the pump is not objectionable, it will be clear that a pumping unit 25 of relatively small capacity may supply the needs of a relatively large refrigerating system embodying my invention, such a pumping outfit operating almost continuously, due to the relatively constant demand of the boiler 8 and the counter-balancing storage effect of the tank 28 on the other parts of the system whose demands are irregular.

My invention, as hereinbefore stated, is not limited to any particular boiler type of refrigeration in the brine tank 6, nor to any particular construction of thermostatically operated expansion valve device 38, nor to any particular type of refrigerating unit 16; nor to the exact arrangement shown of the circulating pipes of the system.

Many changes and modifications may be made in the embodiment of my invention hereinbefore illustrated and described without departing from the spirit of the invention or sacrificing its advantages.

I claim:—

1. In a refrigerating cabinet, a first compartment containing refrigerating liquid, a refrigerating unit of the evaporator type in the liquid, a second compartment, a refrigerator unit of the expansion type comprising a refrigerating conduit in the second compartment, an expansion valve device the operation of which is controlled by temperature alone, the device comprising a thermally responsive means disposed in thermally responsive proximity to said conduit and controlling the supply of refrigerant to the conduit to maintain the conduit at substantially a constant temperature, and a pump for pumping liquid refrigerant to and for withdrawing evaporated refrigerant from each unit independently whereby the temperature of one compartment may be maintained independently of that of the other, the temperature control expansion valve device deriving its controlling temperature from a portion of the conduit in the second compartment and adjustable to vary the temperature of the conduit independently of the temperature of the liquid in the first compartment and to maintain the temperature of the conduit higher than that of the liquid.

2. In a refrigerating cabinet, a first compartment containing refrigerating liquid, a refrigerating unit of the evaporator type in the liquid, a second compartment, a refrigerator unit of the expansion type comprising a refrigerating conduit in the second compartment, an expansion valve device the operation of which is controlled by temperature alone, comprisng a thermally responsive means disposed in thermally responsive proximity to said conduit and controlling the supply of refrigerant to the conduit to maintain the conduit at substantially a constant temperature, and a pump for pumping liquid refrigerant to and for withdrawing evaporated refrigerant from each unit independently whereby the temperature may be maintained independently of that of the other, the thermostatic expansion device being adjustable to vary the temperature of the conduit independently of the temperature of the liquid in the first compartment, and deriving its controlling temperature from a portion of the conduit.

3. In a dispensing soda fountain or the like, a first compartment containing a refrigerating liquid, and adapted to contain a dispensable material container in the liquid, a refrigerating unit of the evaporation type in the liquid, a second compartment containing liquid to be refrigerated and a third compartment, the second compartment being disposed at a substantial height above the first compartment, the second and third compartments being adapted to contain dispensable material containers, a refrigerant conduit for refrigerating liquid in the second compartment and air in the third compartment, the conduit having a portion disposed in each of the two compartments and the two portions being connected in series, a thermo-responsive expansion valve device for controlling supply of refrigerant to the refrigerating conduit, a refrigerant pump connected by conduits to supply refrigerant under pressure to the refrigerating unit and to the expansion valve device independently and to withdraw evaporated refrigerant from the unit and from the conduit independently, the thermo-responsive valve device being associated with the conduit to respond to relatively high temperature portion thereof at the suction side of the conduit portion in the third compartment.

4. In a refrigerating cabinet for dispensing soda fountains and the like, a first compartment containing refrigerating liquid, and adapted to contain containers for dispensable material in the liquid, a refrigerating unit of the evaporation type in the liquid, a second compartment adapted to contain containers for dispensable material, a refrigerating conduit coiled in the second compartment, a third compartment, a refrigerating unit of the evaporation type of limited capacity in the third compartment, dispensable drinking water conduits associated with the unit in the third compartment and adapted to be chilled thereby, a fourth compartment disposed at a substantially higher level than the first compartment and provided with a refrigerating conduit therein, adapted to contain containers for dispensable material and adapted to be chilled by the conduit, the conduit of the second and fourth compartments being connected in series with each other, an expansion valve device adapted to admit refrigerant to the conduit in the fourth compartment, a refrigerant pump connected by conduits to supply liquid refrigerant to the refrigerating units of the first and third compartments and to the expansion device independently and adapted to withdraw evaporated refrigerant from the first and third compartments and from the conduit independently, a reservoir connected to the suction side of the pump and a thermostatic device for controlling the admission of refrigerant by the expansion device to the conduit and responsive to the temperature of the suction side of the coil in the second compartment.

5. In a dispensing soda fountain or the like, a compartment containing liquid to be refrigerated, a container in the liquid for dispensable material to be maintained at relatively low temperature, a second compartment adapted to contain dispensable material to be maintained at relatively higher temperature, a refrigerating conduit for refrigerating both compartments, the conduit having a portion disposed in the air in the second compartment and in the liquid of the first compartment, the two parts being connected in series, a thermo-responsive expansion valve device for controlling supply of refrigerant to the refrigerating conduit, a refrigerating pump connected by conduit to supply a refrigerant under pressure to the expansion valve device and withdraw evaporated refrigerant from the conduit, the thermo-responsive valve device being associated with the conduit to respond to relatively high temperature thereof at the suction side of the conduit portion in the second compartment.

6. In a refrigerating cabinet, a first compartment containing refrigerating liquid, a refrigerating unit of the evaporator type in the liquid, a second compartment, a refrigerator unit of the expansion type comprising a refrigerating conduit in the second compartment, an expansion valve device controlling the supply of refrigerant to the conduit, to maintain the conduit at substantially a constant temperature, and a pump for pumping liquid refrigerant to, and for withdrawing evaporated refrigerant from, each unit independently whereby the temperature of one compartment may be maintained independently of that of the other, the temperature control expansion valve device being operable in response to changes of temperature only and having a temperature responsive means disposed in thermally responsive proximity to a portion of the conduit in the second compartment and comprising a thermostat and a valve operable thereby whereby the supply of refrigerant may be varied continuously in correspondence with variations of temperature of the conduit portion, and the device being adjustable to vary the temperature of the conduit independently of the temperature of the liquid in the first compartment and to maintain the temperature of the conduit higher than that of the liquid.

7. In a refrigerating cabinet, a first compartment containing refrigerating liquid, a refrigerating unit of the evaporator type in the liquid, a second compartment, a refrigerator unit of the expansion type comprising a refrigerating conduit in the second compartment, an expansion valve device controlling the supply of refrigerant to the conduit, to maintain the conduit at substantially a constant temperature, and a pump for pumping liquid refrigerant to, and for withdrawing evaporated refrigerant from, each unit independently whereby the temperature of one compartment may be maintained independently of that of the other, the thermostatic expansion device comprising a thermostat and a valve operable thereby the thermostat being disposed in thermally responsive proximity to said conduit whereby the supply of refrigerant may be varied continuously in correspondence with variations of temperature of the said conduit, and the device being adjustable to vary the temperature of the conduit independently of the temperature of the liquid in the first compartment.

EDWARD C. KOEPKE.